United States Patent Office.

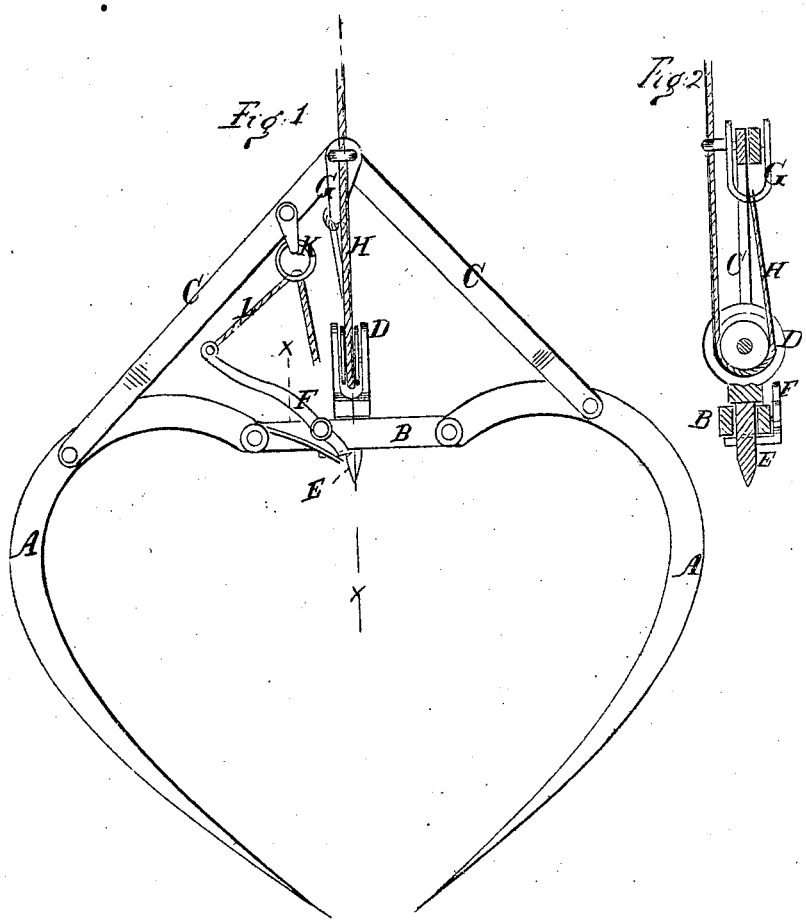

THOMAS C. KELLY, OF WEST LIBERTY, PENNSYLVANIA.

Letters Patent No. 92,975, dated July 27, 1869.

IMPROVEMENT IN HORSE HAY-FORKS.

The Schedule referred to in these Letters Patent and making part of the same.

*To all whom it may concern:*

Be it known that I, THOMAS C. KELLY, of West Liberty, in the county of Butler, and State of Pennsylvania, have invented a new and improved Hay-Elevating Fork; and I do hereby declare that the following is a full, clear, and exact description thereof, which will enable others skilled in the art to make and use the same, reference being had to the accompanying drawings, forming part of this specification.

The object of this invention is to provide a simple and effective hay-elevating fork, for raising hay by horse or other power.

The invention consists in an arrangement of curved tines, pivoted to a short straight bar, as a head, to which a sheave for the hoisting-rope is detachably connected, through which sheave the rope passes to the joint of a pair of arms, connected to the tines, each side of their joints with the head, so that when the sheave is attached to the head and secured by the trip-lever, the action of the hoisting-rope will close the tines, and when the said sheave is disconnected by the trip-catch, the strain will fall upon the arms and open the tines, all as hereinafter specified.

Figure 1 represents a front elevation of my improved fork, and

Figure 2 represents a section of the same, taken on the line x x of fig. 1.

Similar letters of reference indicate corresponding parts.

A represents two curved tines, hinged to the ends of a head, B, consisting of a straight bar.

C represents two arms, jointed to the tines at a suitable distance from the joints with the head. The other ends of these arms are brought together behind the centre of the head B, and pivoted.

D represents a sheave, the stock of which is fitted at E, to a transverse mortise through the head B, and projects sufficiently to be secured by the trip-bar F, which springs into a notch in the side of the said projection.

G represents a yoke, suspended from the arms C, at their junction, for the connection of the end of the hoisting-rope H after passing through the sheave.

The trip rope I passes through a guide-ring, K, suspended from one of the arms C above the trip-catch, and is connected to the long arm of the trip-lever F, which is pivoted to the head B.

When a load of hay is to be taken, the tines being in the open condition, are forced into the hay as much as possible.

The sheave-stock is then inserted in the hole in the head, so that the spring-catch will engage in the notch of the projection E, and hold it. The power is then applied to the rope, and the operator presses the arms C down, or resists the tendency of the rope to raise the fork, which causes the head B to be drawn up, closing the tines, and securing the hay.

When the hay has been elevated, the trip-catch is pulled out of the notch in the projection E of the head, which causes the weight of the load to be suspended on the arms C. This opens the tines and allows the hay to escape.

Having thus described my invention,

I claim as new, and desire to secure by Letters Patent—

The tines A, head B, jointed arm C, sheave D, spring-catch and cords H and I, all combined and arranged substantially as specified.

THOS. C. KELLY.

Witnesses:
JOHN ALLEN,
S. C. GRAHAM.